(12) United States Patent
Bileth

(10) Patent No.: US 7,328,907 B1
(45) Date of Patent: Feb. 12, 2008

(54) DISPLAY RACK TRANSPORT DEVICE

(75) Inventor: Jack L Bileth, Greenville, MI (US)

(73) Assignee: Fixture Tech., Inc., Greenville, MI (US)

( * ) Notice: Subject to any disclaimer, the term of this patent is extended or adjusted under 35 U.S.C. 154(b) by 347 days.

(21) Appl. No.: 11/086,083

(22) Filed: Mar. 22, 2005

Related U.S. Application Data

(60) Provisional application No. 60/555,490, filed on Mar. 23, 2004.

(51) Int. Cl.
*B62B 1/04* (2006.01)

(52) U.S. Cl. .................................. 280/79.11; 280/79.3

(58) Field of Classification Search ............. 280/79.11, 280/79.3, 79.6, 79.7; 16/45; 211/189, 190
See application file for complete search history.

(56) References Cited

U.S. PATENT DOCUMENTS

| | | | | |
|---|---|---|---|---|
| 2,508,661 A | * | 5/1950 | Campbell | .................... 414/458 |
| 2,937,850 A | | 5/1960 | Winkler et al. | |
| 3,010,592 A | | 11/1961 | Chadwick | |
| 3,041,083 A | * | 6/1962 | Blanc | ...................... 280/43.21 |
| 3,145,863 A | | 8/1964 | Dunaski | |
| 3,195,859 A | | 7/1965 | Jackson et al. | |
| 3,250,513 A | | 5/1966 | Fenner et al. | |
| 3,261,487 A | | 7/1966 | Talbert | |
| 3,327,996 A | * | 6/1967 | Morse | ........................ 254/2 R |
| 3,570,694 A | | 3/1971 | Tantlinger | |
| 3,887,209 A | * | 6/1975 | Blanc | ...................... 280/43.21 |
| 3,931,986 A | | 1/1976 | Hunziker | |
| 4,231,709 A | * | 11/1980 | Corsetti | ....................... 414/458 |
| 4,241,803 A | * | 12/1980 | Lauber | ........................ 180/8.1 |
| 4,447,012 A | * | 5/1984 | Woodruff | ................. 242/423.1 |
| 4,516,901 A | | 5/1985 | Riedl | |
| 4,611,816 A | | 9/1986 | Traister et al. | |
| 4,699,391 A | | 10/1987 | Syring | |
| 4,921,264 A | | 5/1990 | Duffy | |
| 4,934,893 A | | 6/1990 | Johnson | |
| 4,961,680 A | * | 10/1990 | Riedl et al. | ................. 414/458 |
| 5,044,864 A | * | 9/1991 | Stefan | ........................ 414/459 |
| 5,193,828 A | | 3/1993 | Benvenuti | |
| 5,244,221 A | * | 9/1993 | Ward | ......................... 280/79.7 |

(Continued)

OTHER PUBLICATIONS

Engineering drawing illustrating "Low Bracket Assembly" device: In use more than one year prior to Mar. 23, 2004.

(Continued)

*Primary Examiner*—Christopher P. Ellis
*Assistant Examiner*—Brian Swenson
(74) *Attorney, Agent, or Firm*—Van Dyke, Gardner, Linn & Burkhart, LLP

(57) ABSTRACT

A display rack transport device includes a wheel assembly and a display mount. The display mount is removably mountable to the wheel assembly and mountable to a display rack. Variously configured display mounts are adapted to mount to various styles of display racks, such as pallet racks, storage racks, and shelf racks. The wheel assembly includes one or more pivotally mounted wheels and is adapted to enable the display mount to raise and lower relative to the wheel assembly when the display mount is mounted to the wheel assembly. The raising and lowering of a display mount that is mounted to a display rack enables the display rack to be repositioned utilizing the pivoting wheels of the wheel assembly.

18 Claims, 8 Drawing Sheets

U.S. PATENT DOCUMENTS

| | | | | |
|---|---|---|---|---|
| 5,411,234 | A * | 5/1995 | Schoeller | 248/345.1 |
| 5,716,186 | A | 2/1998 | Jensen et al. | |
| 5,779,255 | A | 7/1998 | Garcia, Jr. | |
| 5,782,600 | A | 7/1998 | Walsh | |
| 5,800,114 | A * | 9/1998 | Secondi | 414/458 |
| 5,822,829 | A | 10/1998 | Webb et al. | |
| 5,924,168 | A | 7/1999 | Webb et al. | |
| 5,927,731 | A * | 7/1999 | Clarke | 280/79.7 |
| 6,059,512 | A * | 5/2000 | Kielinski | 414/490 |
| 6,095,537 | A | 8/2000 | Cozza et al. | |
| 6,155,770 | A * | 12/2000 | Warhurst | 414/498 |
| 6,315,079 | B1 * | 11/2001 | Berends et al. | 187/210 |
| 6,431,805 | B2 | 8/2002 | Lanciaux, Jr. | |
| 6,505,844 | B2 * | 1/2003 | Hallman et al. | 280/79.7 |
| 6,511,082 | B2 * | 1/2003 | Shirai | 280/79.11 |
| 6,634,658 | B2 * | 10/2003 | Larouche | 280/47.2 |
| 6,871,747 | B2 * | 3/2005 | Bustos | 211/50 |
| 7,055,789 | B2 * | 6/2006 | Libbey et al. | 248/278.1 |
| 2003/0091417 | A1 | 5/2003 | Swann | |
| 2004/0245419 | A1 * | 12/2004 | Sweere et al. | 248/276.1 |

OTHER PUBLICATIONS

Engineering drawing illustrating "High Bracket Assembly" device: In use more than one year prior to Mar. 23, 2004.

Brochure *Aisle-Mover: For Retail Stores and Libraries*; Distributed by Innovative Moving Systems, Inc. of South Holland, IL.

Information Packet *Gondola Moving System*; May 2002, Distributed by 5 Star Ventures of Kaysville, UT.

Brochure *Imagine: The Roll-It 'Rolling Jack'*; Distributed by Roll-it of Lachine, Quebec and Grand Rapids, MI.

Brochure *Link 4: Gondola Moving Equipment*; Distributed by Barber's Metal Fabricating of Ames, IA.

* cited by examiner

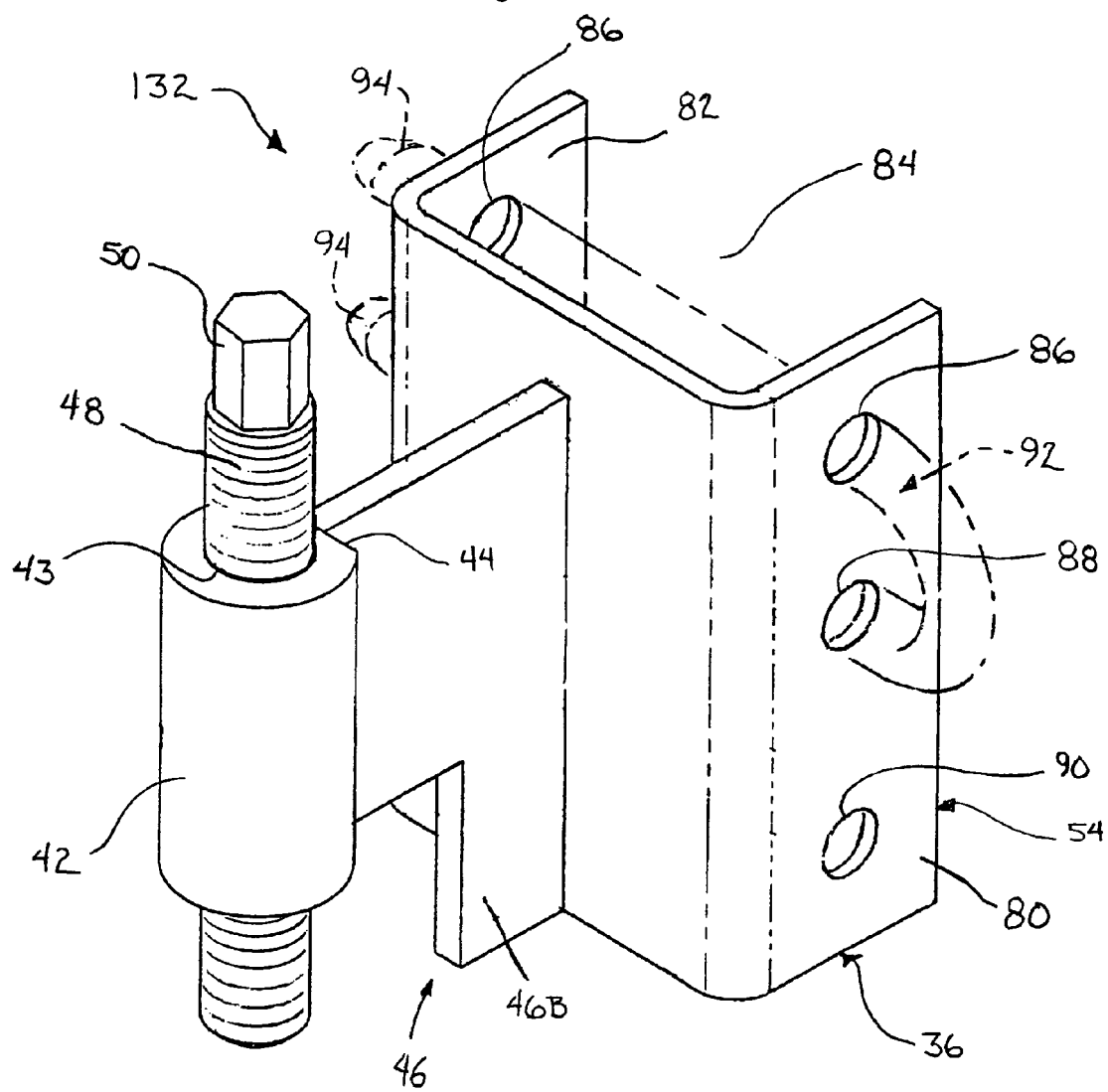

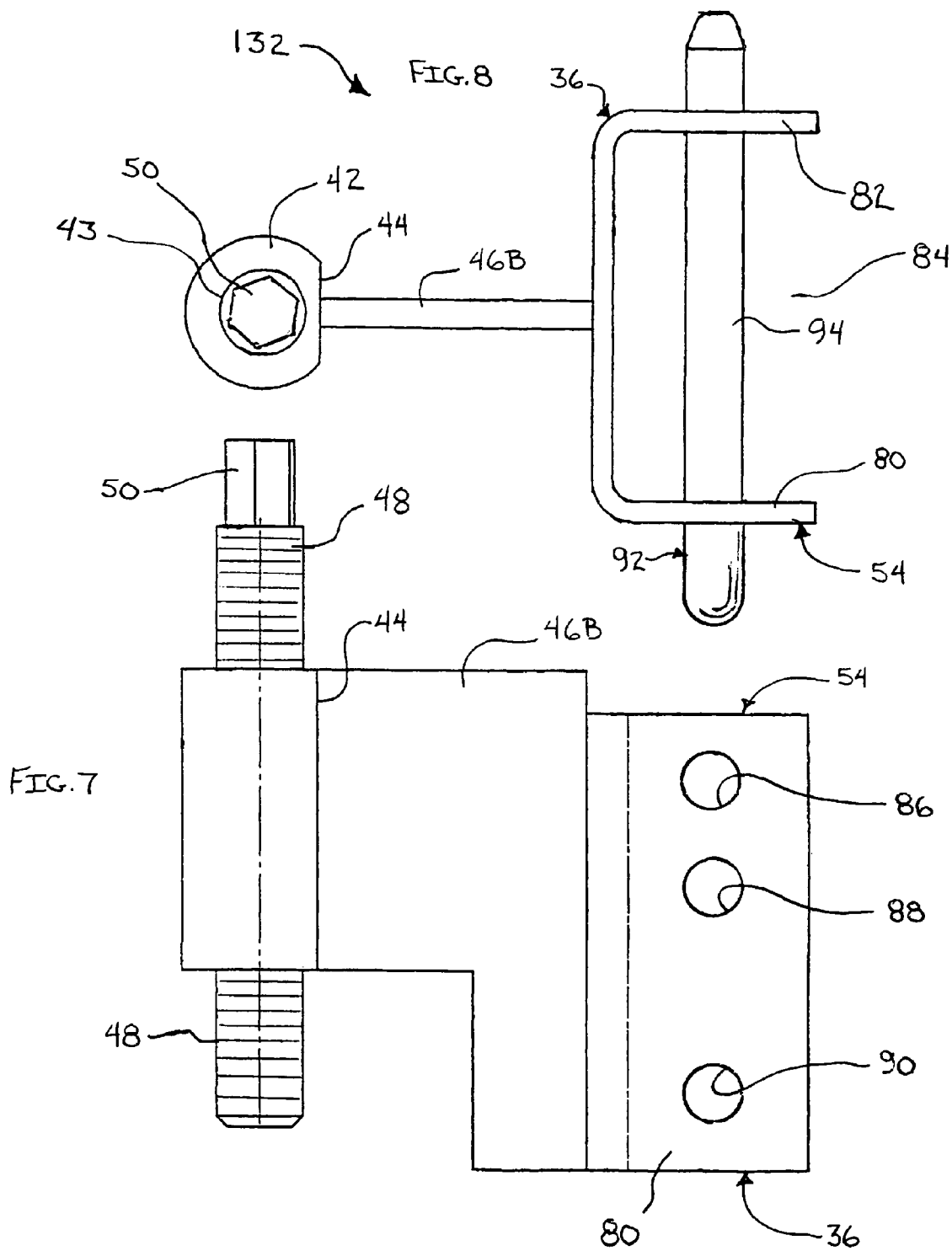

DISPLAY RACK TRANSPORT DEVICE

CROSS REFERENCE TO RELATED APPLICATION

The present application claims priority of U.S. provisional application, Ser. No. 60/555,490, filed Mar. 23, 2004, by Bileth for DISPLAY RACK TRANSPORT DEVICE, which is hereby incorporated herein by reference in its entirety.

BACKGROUND AND TECHNICAL FIELD OF THE INVENTION

The present invention is directed to a display rack transport device for the moving of display and storage racks, and in particular a preferred embodiment of the present invention enables multiple styles of display racks to be easily moved using a limited number of components.

Display racks are commonly used to store or exhibit products and typically have multiple horizontal shelves, or storage locations, such that a greater quantity of goods may be stored or displayed within a given area. Display racks are commonly seen in grocer stores, general merchandise stores, and clothing stores. However, many variations of display racks exist and are utilized in other environments as well, such as bookstores, home building supply stores, and warehouses.

It is often necessary to move such display racks, such as for cleaning, floor replacement, remodeling, or simply altering the location of the goods being presented to consumers. This moving or repositioning of display racks can be difficult and time consuming. Typically, to relocate such display racks, the shelves must be unloaded, the racks then disassembled, and the individual components relocated and then reassembled. In addition to being time consuming, such a process may also cause damage to the display racks and/or the products and goods stored on the display racks due to the additional handling. Alternatively, such display racks may be moved without disassembling them, such as by manually lifting them or dragging them across a floor surface. However, this method is also problematic in that damage may occur to the floor surface or injuries may result.

Therefore, what is needed is an efficient, easy, and safe method for transporting display racks that does not require disassembly of the display rack and allows movement of the display rack with reduced effort.

SUMMARY OF THE INVENTION

A display transport device according to the present invention includes a wheel assembly and a display mount adapted to enable easy movement of a display rack. The display mount is movably attached to the wheel assembly and is mountable to a display rack.

In one embodiment of the present invention, a display rack transport device for moving pallet racks comprises a wheel assembly and a display mount that is movably attachable to the wheel assembly. The mount comprises a pallet rack mount having a generally C-shaped brace with spaced first and second legs that each include at least one hole, where the at least one hole on the first leg is in substantial alignment with the at least one hole on the second leg. The C-shaped brace is adapted to receive a generally vertical member of a pallet rack such that each of the at least one holes substantially aligns with through holes on the generally vertical member of the pallet rack.

According to another aspect of the present invention, a display rack transport device for moving storage racks comprises a wheel assembly and a display mount that is movably attachable to the wheel assembly. The display mount comprises a storage rack mount having first and second mounting flanges, each of which have at least two holes with the at least two holes on the first mounting flange being in substantial alignment with the at least two holes on the second mounting flange. The first and second mounting flanges are adapted to receive a generally horizontal base support of a storage rack, with the at least two holes on the first and second mounting flanges being located with respect to one another such that at least one hole on each of the first and second mounting flanges substantially aligns with a through hole on the base support of the storage rack when the base support is received between the mounting flanges, such that the storage rack mount is mountable to more than one model of storage rack.

According to yet another aspect of the present invention, a display rack transport device for moving shelf racks comprises a wheel assembly and a display mount that is movably attachable to the wheel assembly. The display mount comprises a shelf rack mount having first and second mounting members, the first and second mounting members each having at least one hole with the at least one hole on the first mounting member being in substantial alignment with the at least one hole on the second mounting member. The first and second mounting members are adapted to receive a generally vertical support member of a shelf rack such that both the at least one holes on the mounting members are not covered by the vertical support member and are positioned below a generally horizontal support member connected to the generally vertical support member of the shelf rack.

According to still another aspect of the present invention, a display rack transport device comprises a wheel assembly and a display mount that is movably attachable to the wheel assembly. The display mount comprises a mounting bracket having spaced first and second mounting flanges, each of which include a plurality of holes. The holes on the first mounting flange are in substantial alignment with the holes on the second mounting flange and the mounting bracket is adapted to be removably mounted to a display rack.

The display rack transport device of the present invention provides an efficient and safe method for relocating display racks, such as pallet racks, storage racks, shelf racks, and/or the like. A common wheel assembly may be used with multiple different display mounts, such as a pallet rack mount, storage rack mount, shelf rack mount, and/or the like, thereby enabling many different display racks to be moved using fewer components. In addition, the ability of the pallet rack mount and the storage rack mount to affix to different models or styles of pallet racks and storage racks, respectively, further increases the flexibility and capability of the transport device. By securing multiple display mounts located within wheel assemblies to a display rack, the display rack may be raised in an accurate and controlled manner, such as by rotation of a threaded rod. Upon elevating the display rack, it may be easily and efficiently relocated by the wheeled transport devices, and subsequently lowered at the relocated area, such as by rotating the threaded rod in the opposite direction.

BRIEF DESCRIPTION OF THE DRAWINGS

FIG. 6 is a perspective view of the pallet rack mount of FIG. 5;

FIG. 7 is a side elevation view of the pallet rack mount of FIG. 6;

FIG. 8 is a top plan view of the pallet rack mount of FIG. 6;

DESCRIPTION OF THE PREFERRED EMBODIMENTS

The present invention is embodied in a display rack transport device for the moving or re-positioning of display racks. The display rack transport device of the present invention may enable several different styles of display racks to be readily moved using a minimum or reduced number of different components and effort.

Figure 1:
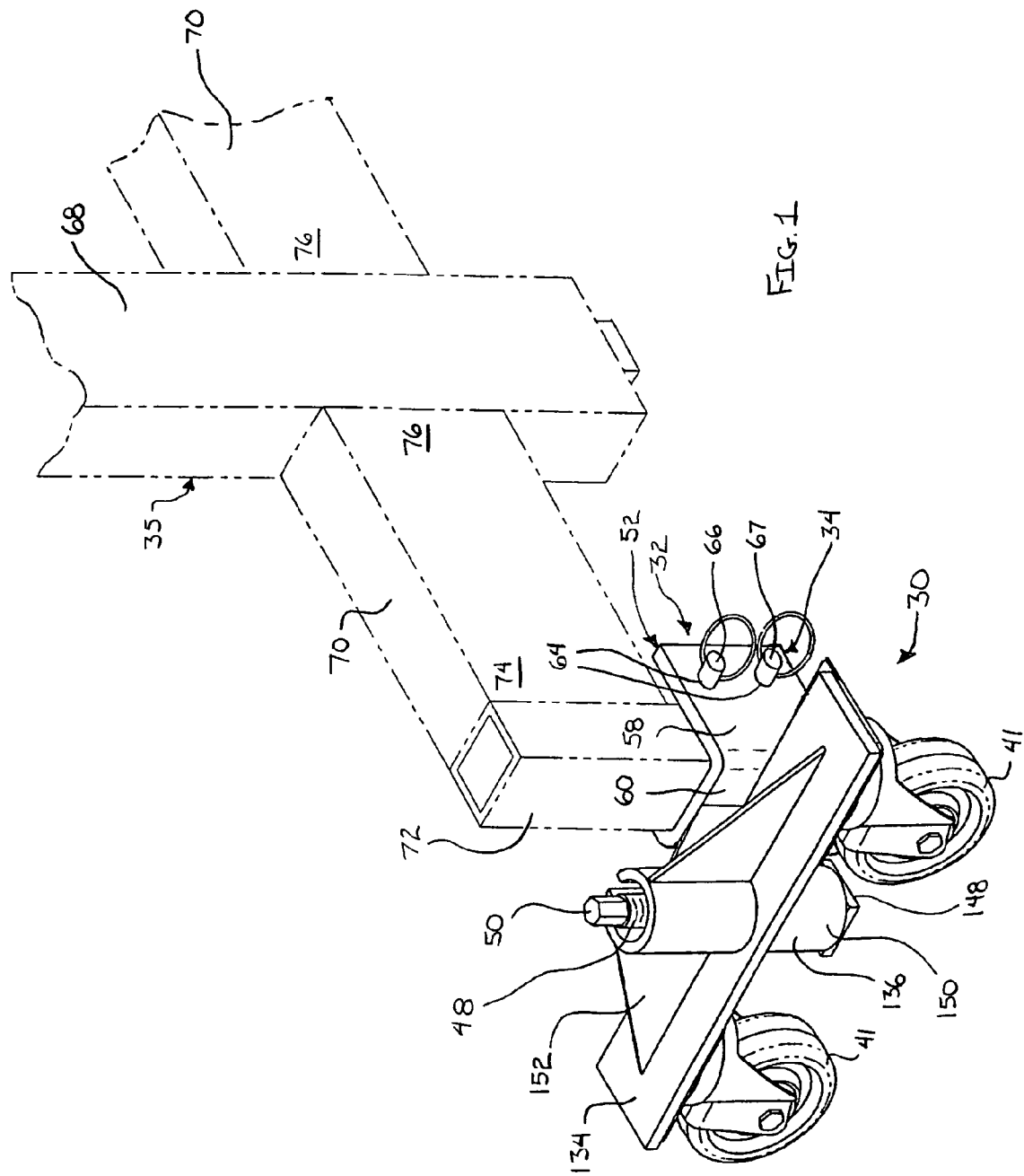
FIG. 1 is a perspective view of a shelf rack mount style of a display mount of the present invention, as installed into a wheel assembly and attach to a shelf rack support stand.
Figure 5:
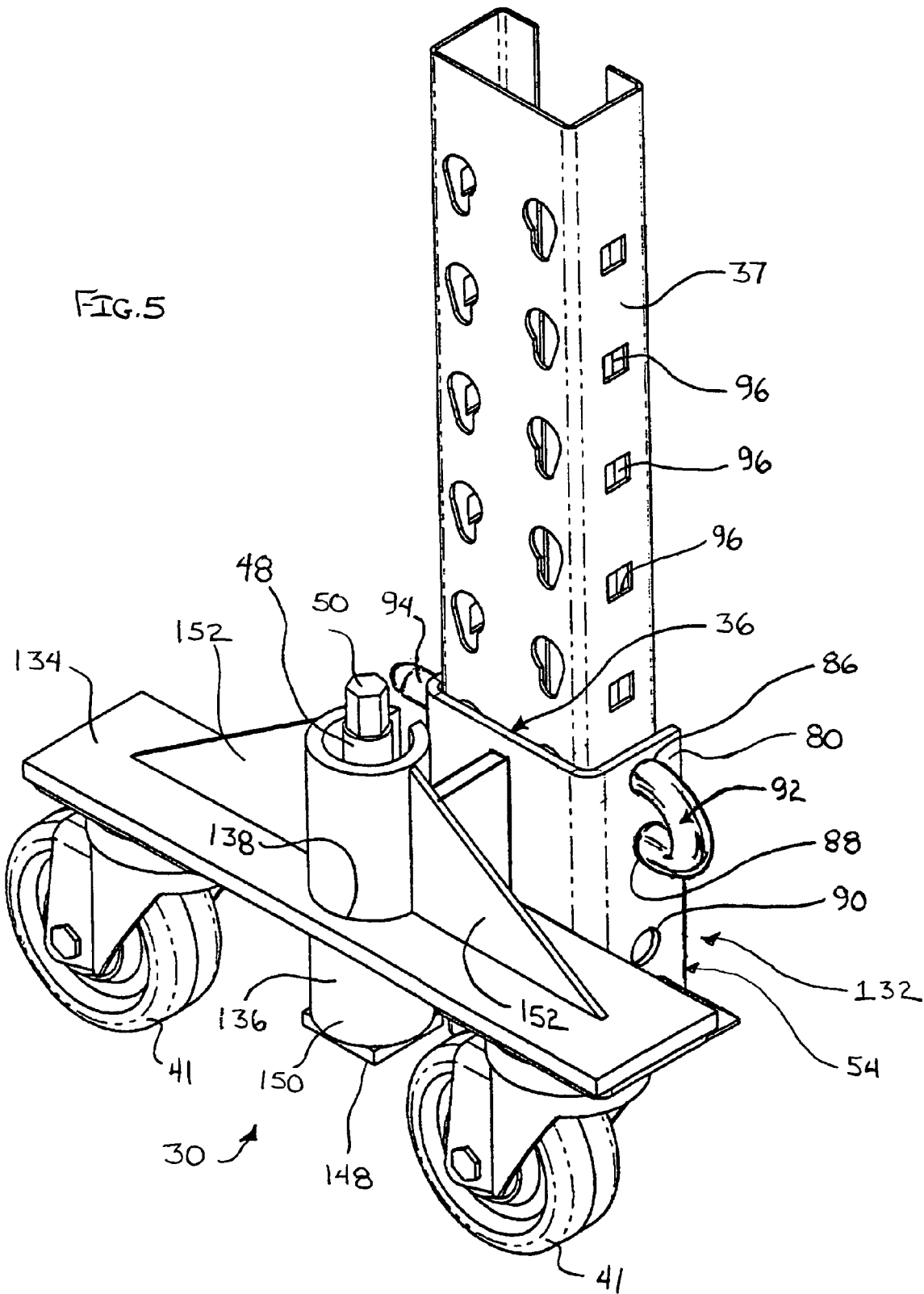
FIG. 5 is a perspective view of a pallet rack mount style of a display mount of the present invention, as installed into a wheel assembly and attached to the leg of a pallet rack.
Figure 9:
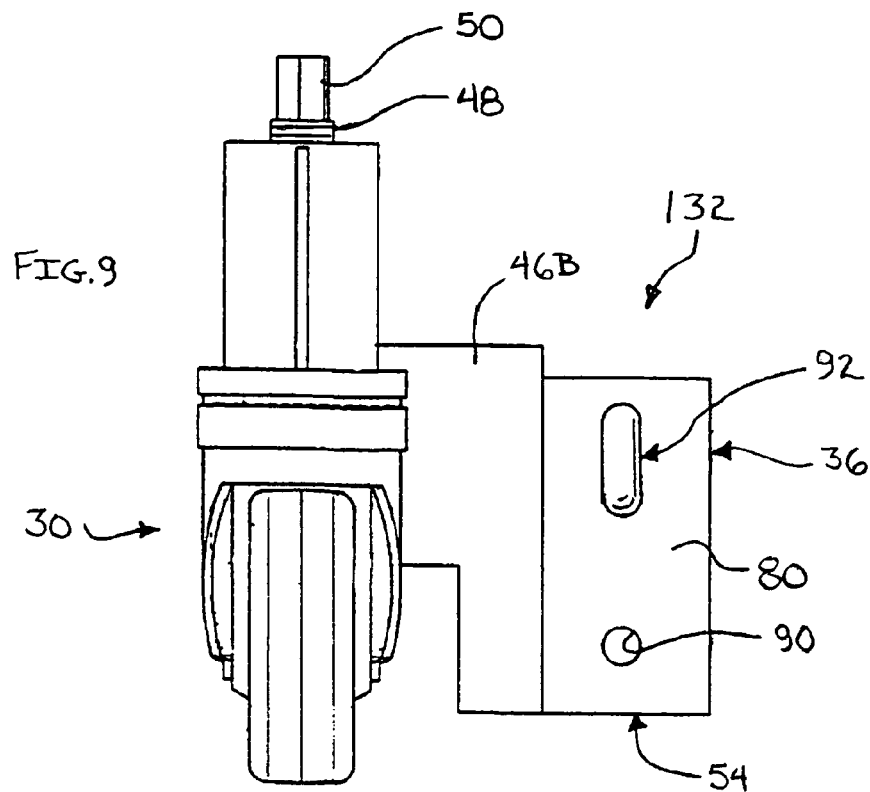
FIG. 9 is a side elevation view of the pallet rack mount and wheel assembly of FIG. 5.
Figure 10:
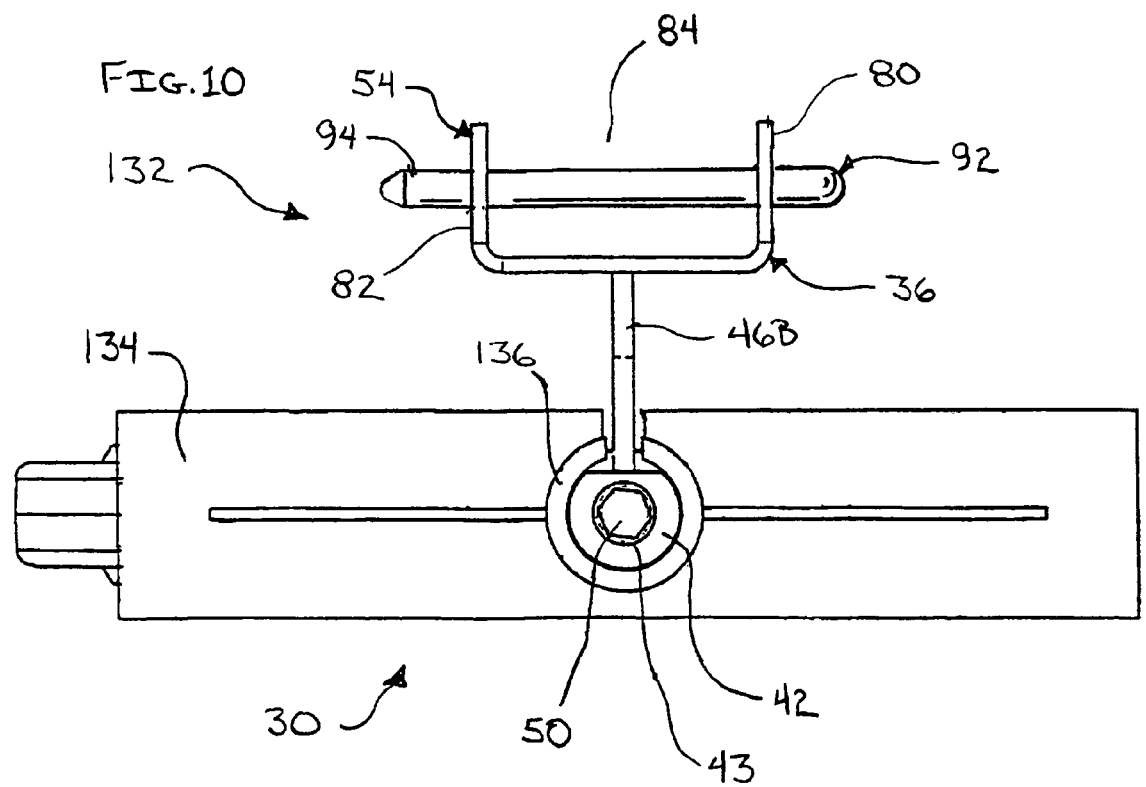
FIG. 10 is a top plan view of the pallet rack mount and wheel assembly of FIG. 5.

Two embodiments of the present invention can be seen in FIGS. 1 and 5 as comprising a wheel assembly 30 and a display mount 32, 132 where the display mounts 32, 132 are removable from the wheel assembly 30 and are adapted to engage different styles of display racks. The first display mount 32 of FIG. 1 is a shelf rack mount 34 adapted to mate with a support stand 35 of a shelf rack that is constructed of multiple support stands 35 connected by multiple horizontal shelves (not shown). The second display mount 132 of FIG. 5 is a pallet rack mount 36 adapted to mate to the generally vertical member or pallet rack leg 37 of a pallet rack that stores pallets of product in a horizontal orientation at vertically spaced locations.

To move a particular display rack, multiple corresponding display mounts 32, 132 fitted within wheel assemblies 30 are intermittently spaced along the base of the particular style of display rack that is to be moved. The number of display mount 32, 132 and wheel assembly 30 combinations required to move a particular display rack being dependent upon the size and configuration of the display rack. The display mounts 32, 132 are then elevated relative to wheel assembly 30, which in turn raises the display rack off the floor. The wheels 41 of wheel assemblies 30 enable the display rack to be moved or re-positioned by pushing or pulling. Once in the desired location, the display rack is placed back on the floor by causing the display mounts 32, 132 to lower relative to wheel assemblies 30. The specific functioning of raising and lowering the display mounts 32, 132 with respect to wheel assemblies 30 is discussed in detail below.

Figure 2:
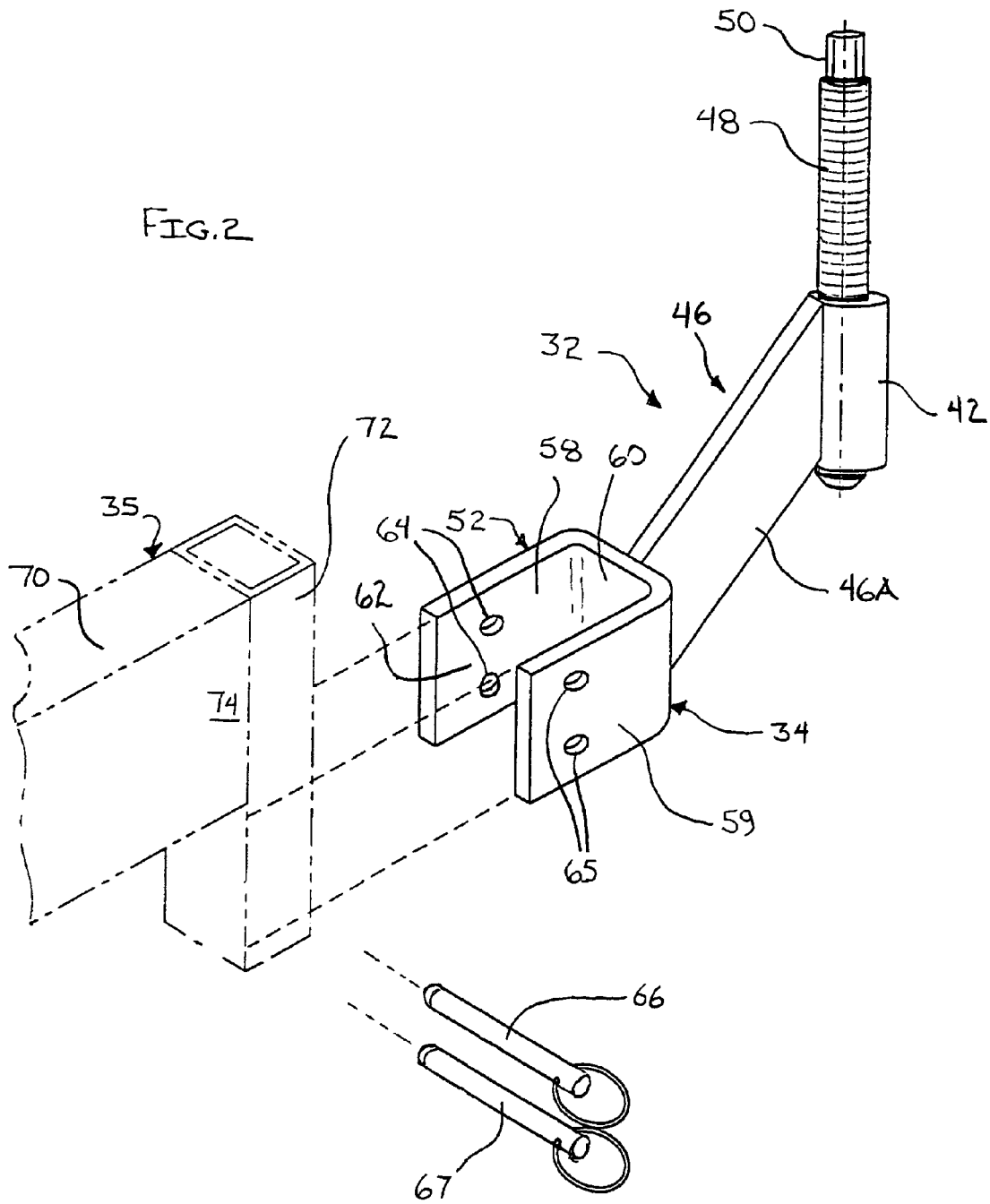
FIG. 2 is a perspective view of the shelf rack mount of FIG. 1, shown removed from the wheel assembly and prior to engagement with the opposite end of the support stand.

The display mounts 32, 132 (the shelf rack mount 34 and pallet rack mount 36) each include several common components that enable them to be interchangeably received by the wheel assembly 30. The common or similar components include a sleeve 42 having an internally threaded through hole 43 and a mounting face 44, and a threaded rod 48 with a head 50. The threaded rod 48 is threadably engaged with the sleeve 42. A display mount gusset 46 is attached to the mounting face 44. Notably, the display mount gussets 46 vary in geometry between the display mounts 32, 132 based on the particular brace or mounting bracket 52, 54 required for a particular application. As shown in FIG. 2, mounting bracket 52 of shelf rack mount 34 utilizes display mount gusset 46A. As shown in FIG. 6, mounting bracket 54 of pallet rack mount 36 utilizes display mount gusset 46B. Although there may be variations in the forms of display mount gussets 46A, 46B and mounting brackets 52, 54, it will be seen that the function served remains the same between the various embodiments.

Figure 3:
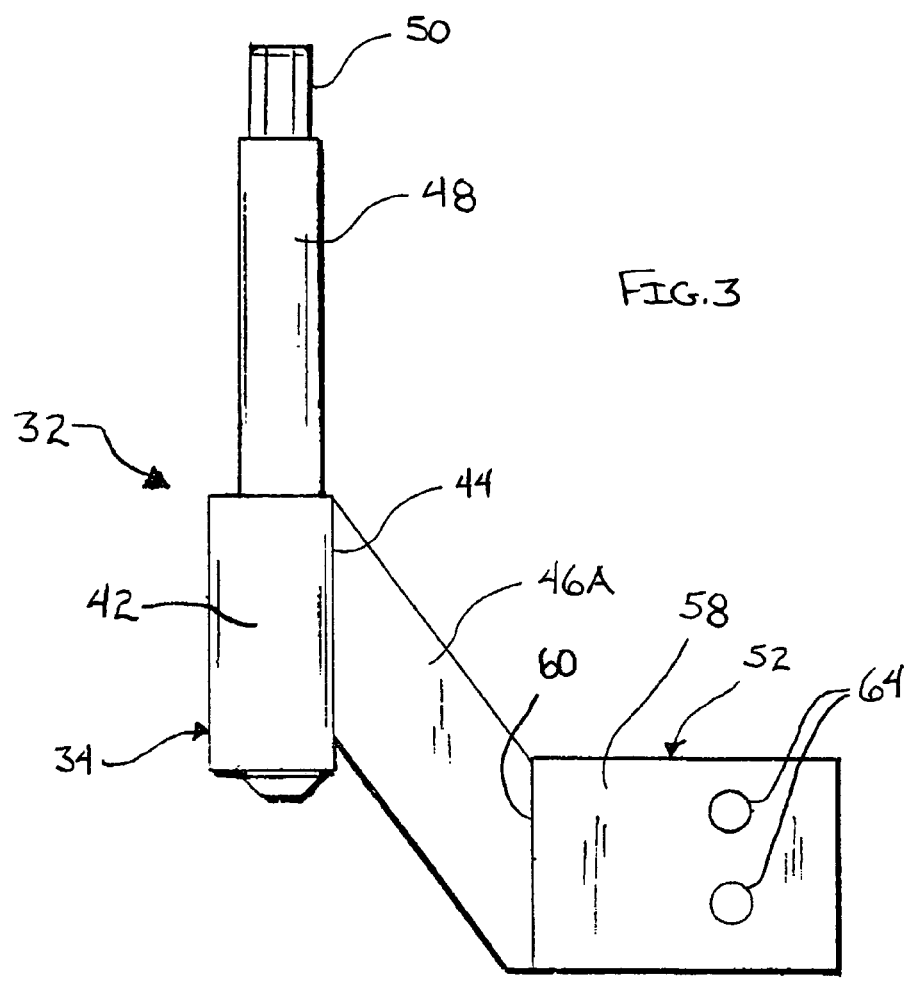
FIG. 3 is a side elevation view of the shelf rack mount of FIG. 2.
Figure 4:
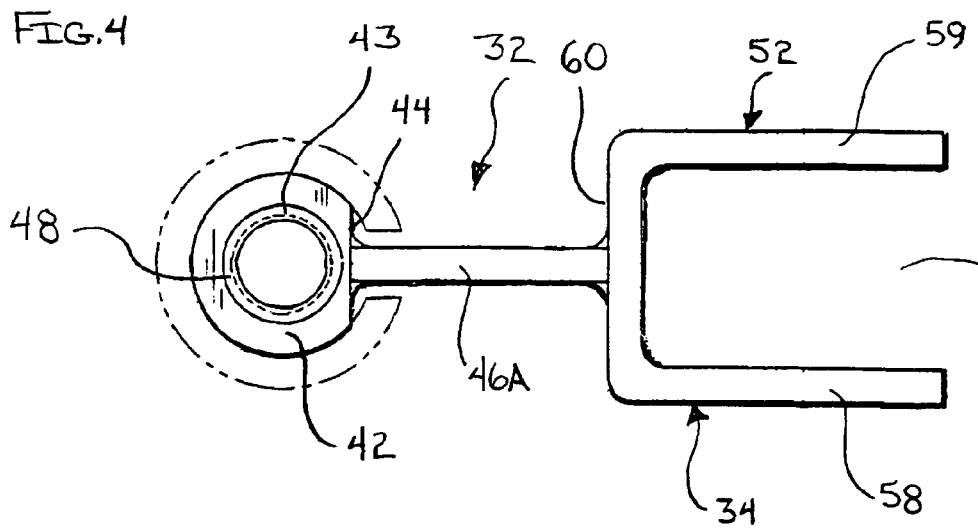
FIG. 4 is a top plan view of the shelf rack mount of FIG. 2.

The components specific for the first display mount 32 or shelf rack mount 34 are best understood from FIGS. 1-4. As illustrated, the shelf rack mount 34 includes a generally C-shaped mounting bracket 52 secured to display mount gusset 46A. Mounting bracket 52 has spaced, generally parallel first and second mounting flanges or mounting members 58, 59 and a back wall 60, where back wall 60 is secured to display mount gusset 46A. First and second mounting members 58, 59 define an opening 62 opposite back wall 60. Display mount gusset 46A, as shown in FIGS. 2 and 3, is angled downwardly relative to sleeve 42 such that mounting bracket 52 may be positioned closer to the floor or horizontal surface upon which wheel assembly 30 is placed when sleeve 42 of shelf rack mount 34 is attached to or placed within wheel assembly 30, as discussed below. As also shown in FIGS. 2 and 3, first and second mounting members 58, 59 are substantially vertically oriented when sleeve 42 of shelf rack mount 34 is in a substantially vertically upright position.

First and second mounting members 58, 59 each include two holes 64, 65, where holes 64 on first mounting member 58 are in substantial alignment with holes 65 on second mounting member 59. Additionally, holes 64, 65 on members 58, 59 are in generally vertical alignment with respect to one another when sleeve 42 is in a generally vertically upright position, as shown in FIGS. 2 and 3. Holes 64, 65 are adapted to receive upper and lower lift pins 66, 67 that are sized to be simultaneously received by holes 64, 65 on both first and second mounting members 58, 59 such that lift pins 66, 67 span the distance between first and second mounting members 58, 59.

As illustrated in FIGS. 1 and 2, and as noted above, shelf rack mount 34 is adapted to engage a support stand 35 of a shelf rack. Support stand 35 may be constructed of tubular steel, or the like, and includes a central upright member 68 from which two generally horizontal support members 70 extend in opposite directions. Support stand 35 further includes a generally vertical support member 72 connected to each horizontal support member 70 at an end 74 of the horizontal support member 70 opposite the end 76 connected to the central upright member 68. Support stand 35 is thus constructed to have a generally inverted T-shape (as can be seen with reference to FIG. 1). A shelf rack is constructed by aligning multiple support stands 35 such that the horizontal support members 70 of the various support stands 35 are in substantially parallel alignment and the vertical support members 72 are in substantially linear alignment. Horizontal shelves (not shown) are then affixed to the horizontal support members 70 such that the shelves span the distance between adjacent support stands 35. In similar fashion, shelves are also affixed to the upright central members 68 of adjacent support stands 35.

FIGS. 1 and 2 disclose that shelf rack mount 34 is specifically adapted to engage a vertical support member 72 of the support stand 35. As can be seen with reference to FIG. 2, opening 62 of mounting bracket 52 is placed around a vertical support member 72 such that first and second mounting members 58, 59 receive the vertical support member 72. When the vertical support member 72 is substantially received within the opening 62 and toward or against the back wall 60 of mounting bracket 52, holes 64, 65 are positioned beyond vertical support member 72 and beneath horizontal support member 70 such that vertical support member 72 does not block the aligned holes 64, 65, whereby lift pins 66, 67 may be inserted through holes 64, 65. Vertical support member 72 is thus contained within the area of mounting bracket 52 defined by first and second mounting brackets 58, 59 back wall 60, and lift pins 66, 67 and, when so contained, mounting bracket 52 is able to vertically move or slide with respect to vertical support member 72. Therefore, when shelf rack mount 34 is caused to be raised in a vertical direction, such as in the manner described below, upper lift pin 66 will engage the bottom of horizontal support member 70 and impart a vertical lift force to support stand 35. When the support stand 35 is elevated, lower lift pin 67 functions to prevent, as viewed in FIG. 1, clockwise rotational movement of shelf rack mount 34 and wheel assembly 30 due to the torque or moment created during lifting.

Although shelf rack mount 34 is disclosed as only including two holes 64, 65 on each first and second mounting member 58, 59, it should be understood that more or less holes may be included without affecting the function of the transport device. For example, multiple pairs of generally vertically aligned holes could be placed on first and second mounting members 58, 59 such that support stands 35 having vertical support members 72 of different sizes may be received by such a mounting bracket. Furthermore, the shelf rack mount may utilize cables or chains or other retaining elements instead of lift pins 66, 67 to raise the support stand without affecting the function of the transport device. For example, cables or chains may be implemented whereby the cables or chains may loop through holes 64, 65 and engage a portion of the support stand.

In the illustrated embodiment, shelf rack mount 34 is constructed of a metallic material, with mounting bracket 52 being constructed from a single piece of material that is formed into the configuration shown and affixed, such as by welding or the like, to display mount gusset 46A. Also in the illustrated embodiment, sleeve 42 is constructed from an internally threaded shaft that is ground or otherwise processed or formed to form or have or define mounting face 44, with display mount gusset 46A being affixed to mounting face 44, such as by welding or the like.

The components specific to the pallet rack mount 36 style of display mount 132 are best understood upon review of FIGS. 5-10. As best shown in FIG. 6, a generally C-shaped mounting bracket or brace 54 having first and second mounting flanges or legs 80, 82 is secured to the display mount gusset 46B, with brace 54 including an opening 84 between legs 80, 82. The C-shaped brace 54 of the illustrated embodiment includes three generally vertically aligned pairs of holes 86, 88, 90, on the first and second legs 80, 82, with the holes 86, 88, 90 of first leg 80 being substantially aligned with the holes 86, 88, 90 of second leg 82. As such, a U-shaped lift pin 92 having two prongs 94 may be inserted into two of the holes 86, 88 on first leg 80 and extended to and passed through the two correspondingly aligned holes 86, 88 on second leg 82 (see FIG. 6). As understood from FIG. 7, the three holes 86, 88, 90 on each leg 80, 82 are not equally spaced with respect to one another. That is, the upper most hole 86 is not spaced the same distance away from the middle hole 88 as the middle hole 88 is spaced from the lower most hole 90. The purpose of the spacing difference is described below.

As illustrated in FIG. 5, and as noted above, pallet rack mount 36 is adapted to engage and receive a generally vertical member or pallet rack leg 37 of a pallet rack. Pallet racks are typically constructed of tubular steel or the like, and usually include at least four pallet rack legs 37 with numerous through holes 96. Through holes 96 are normally used to secure the horizontal support members (not shown) of the pallet rack, when the horizontal support members may be positioned at variously selected heights using through holes 96. In general, pallets containing goods are stored on pallet racks by being placed over at least two horizontal support members. Pallet racks are used in retail home improvement stores, such as LOWE'S® and HOME DEPOT®, and are also utilized in warehouses, or the like.

FIG. 5 discloses that when pallet rack leg 37 is positioned within opening 84 of the C-shaped brace 54, two of the holes 86, 88 of the first and second legs 80, 82 are adapted to align with two of the through holes 96 of the pallet rack leg 37. As such, prongs 94 of U-shaped lift pin 92 may be inserted into and through holes 86, 88 of first leg 80 of C-shaped brace 54, through the through holes 96 of the pallet rack leg 37, and through and out of holes 86, 88 of second leg 82 of C-shaped brace 54. Therefore, when pallet rack mount 36 is caused to be raised in a vertical direction, as described below, lift pin 92 will impart a vertical lift force to pallet rack leg 37.

Pallet rack mount 36 is adapted for use with multiple styles or models of pallet racks. It should be appreciated that, depending upon the manufacturer, or the model, or the intended application, the generally vertical member or pallet rack leg 37 of a pallet rack will be variously designed and constructed. As such, the spacing of the through holes 96 on the pallet rack leg 37 may be varied to accommodate differences in the designs of the various pallet rack legs.

As noted above, the pairs of holes 86, 88, 90 on first and second legs 80, 82 are not equally spaced apart from one another. In a preferred embodiment, the positioning of the pairs of holes 86, 88, 90 on C-shaped brace 54 is configured such that at least two of the three pairs of holes 86, 88, 90 will align with through holes 96 of the pallet rack leg 37 when the pallet rack leg is received in the opening 84. In the illustrated embodiment, three different combinations of pairs of holes 86, 88, 90 may be selected, those being holes 86 and 88, holes 86 and 90, or holes 88 and 90. Therefore, pallet rack mount 36 may be utilized with alternatively configured pallet racks by aligning various pairs of holes 86, 88, 90 on first and second legs 80, 82 with the through holes 96 of the pallet rack leg 37. It should also be understood that alternatively configured U-shaped lift pins 92 having differently spaced prongs 94 thus may be provided.

Although discussed as utilizing U-shaped lift pin 92, it should be appreciated that alternative lift pins may be used without affecting the function of pallet rack mount 36. For example, two separate lift pins may be used that are standard bolts or are specifically machined to mate with the pallet rack legs 37 of a specific pallet rack. Furthermore, depending upon the application, it may be necessary to only utilize a single lift pin.

In the illustrated embodiment, pallet rack mount 36 is preferably constructed of a metallic material, with mounting bracket or brace 54 being constructed from a single piece of material that is formed into the configuration shown and affixed, such as by welding or the like, to display mount gusset 46B.

Figure 11:
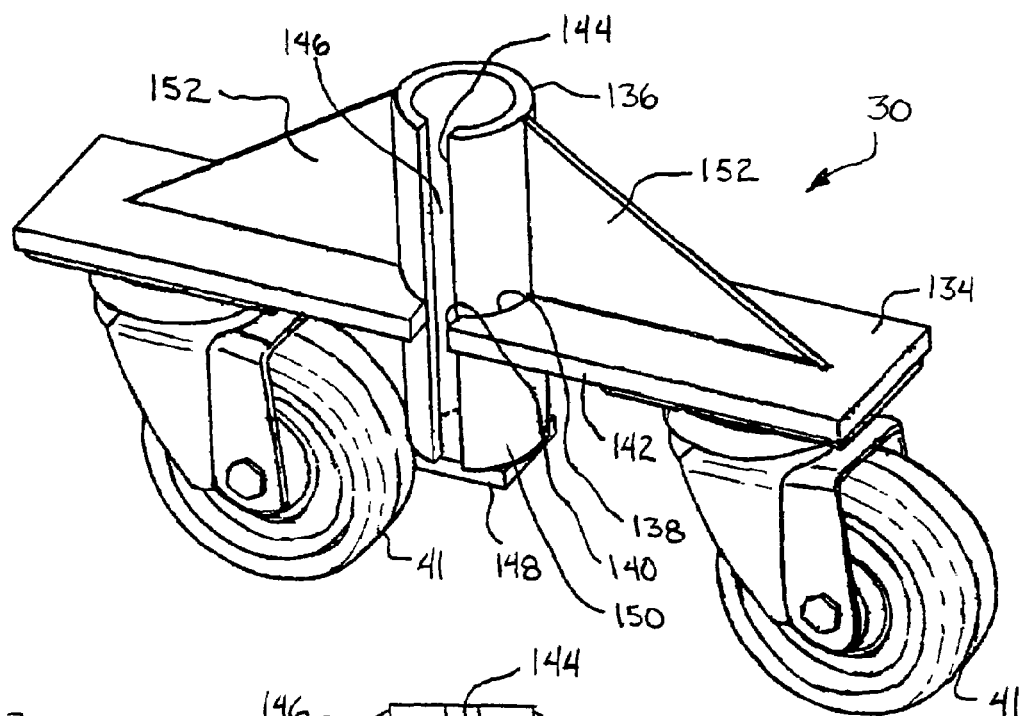
FIG. 11 is a perspective of a wheel assembly suitable for use with the display mounts of the present invention.
Figure 12:
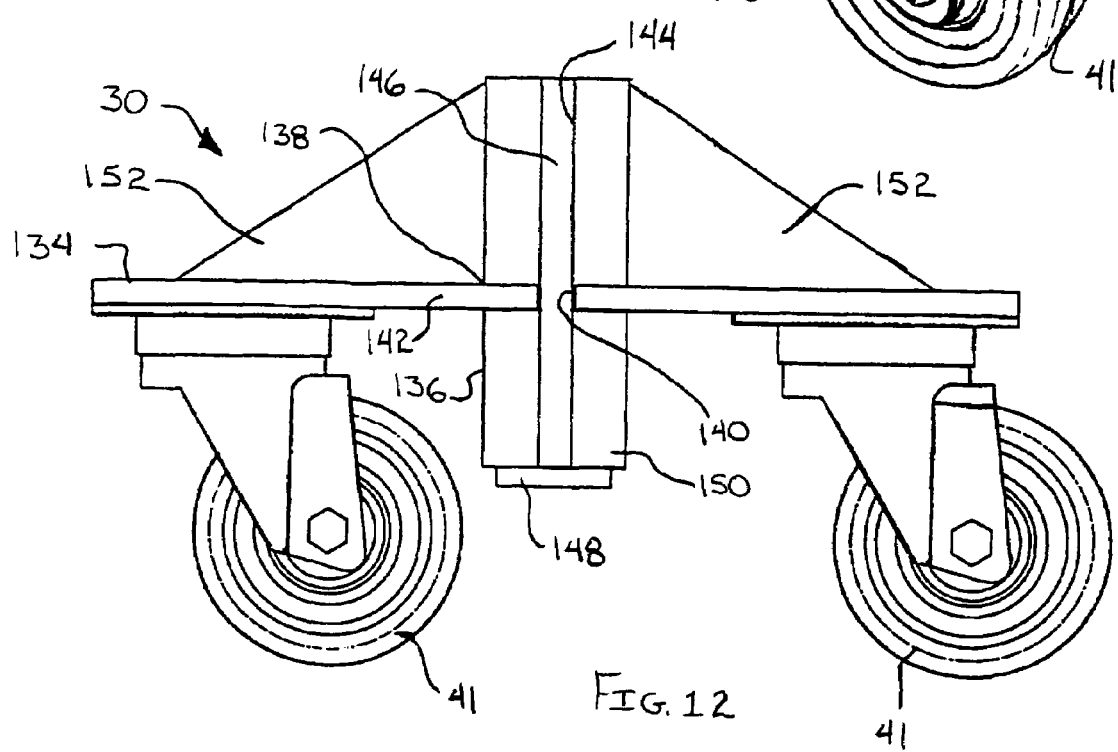
FIG. 12 is a front elevation view of the wheel assembly of FIG. 11.

As best shown in FIGS. 11 and 12, the wheel assembly 30 may have two wheels 41, such as the caster wheels shown, pivotally mounted to a base 134 and a lift sleeve 136 contained within a center hole 138 of the base 134. The base 134 includes a base slot 140 between the center hole 138 and a mounting edge 142 of base 134. The lift sleeve 136 has a sleeve slot 144, with base slot 140 and sleeve slot 144 being generally aligned when lift sleeve 136 is assembled into base 134, such that an open channel 146 is formed from the interior of lift sleeve 136. A sleeve stop 148 is mounted to or attached to a bottom end 150 of lift sleeve 136. In addition, wheel assembly 30 includes two support gussets 152 that are mounted to the base 134 and lift sleeve 136 on opposite sides of lift sleeve 136 in order to enhance the structural rigidity of the wheel assembly by reinforcing lift sleeve 136 and base 134. Though in some applications, it should be understood that gussets 152 may be eliminated, without affecting the scope of the present invention.

In operation, lift sleeve 136 of wheel assembly 30 is adapted to receive sleeve 42 of the display mounts 32, 132. When sleeve 42 of a display mount 32, 132 is placed within lift sleeve 136, mounting face 44 of sleeve 42 is oriented towards sleeve slot 144 such that the display mount gusset 46A, 46B attached to sleeve 42 is disposed out of sleeve slot 144. Initially, threaded rod 48 of display mount 32, 132 is "backed out" such that the bottom of the threaded rod 48 is aligned with the bottom of sleeve 42. In this orientation sleeve 42 rests on sleeve stop 148 such that display mount 32, 132 is located in its lowest vertical position relative to wheel assembly 30.

One or more display mounts 32, 132 and wheel assemblies 30 may be secured to a display rack, using the display mount 32, 132 (or other variations of the display mounts of the present invention) associated with or adapted for or configured for the particular display rack. The initially lowered display mount 32, 132 located in wheel assembly 30 may be readily secured to the display rack, such as in the manner described above. Multiple display mounts and wheel assemblies may be intermittently spaced along the display rack, such as along opposite sides of the display rack, and may be secured at the desired locations along the display rack.

The display mounts 32, 132 are then raised relative to the wheel assemblies 30 by rotating threaded rod 48 contained within sleeve 42. In the illustrated embodiment, rotation of threaded rod 48 is accomplished by engaging the hexagonally-shaped head 50 of threaded rod 48 with a tool, such as a wrench or socket and rotating by hand or by use of an electric or cordless drill. Rotation of threaded rod 48 causes it to contact and rotate on sleeve stop 148. Because sleeve 42 is prevented from rotating within lift sleeve 136 due to the projection of the display mount gusset 46 out of sleeve slot 144, continued rotation of threaded rod 48 will cause sleeve 42 to be raised within lift sleeve 136. Because the display mount 32, 132 is fixedly secured to the display mount gusset 46, which in turn is fixedly secured to the sleeve 42, raising of the sleeve 42 will necessarily raise the display rack affixed to the display mount 32, 132. The raising of a display rack by rotation of threaded rod 48 also enables the display rack to be raised in a controlled and accurate manner as a result of the limited vertical displacement of sleeve 42 upon rotation of threaded rod 48 due to the relatively small thread pitch of threaded rod 48.

After the display rack has been sufficiently raised in the above manner by the intermittently spaced combinations of display mounts 32, 132 and wheel assemblies 30, the display rack may be readily moved utilizing wheels 41 that are rotatably attached to the wheel assemblies 30. After the display rack is pushed or pulled into the desired position, it may be lowered by rotating the threaded rods 48 in the direction opposite that required for lifting.

In the illustrated embodiments, the display mounts 32, 132 are removably attached to the respective wheel assembly 30. Optionally, the display mount may be secured within the wheel assembly such that it may not be readily removed. For example, the channel 146 may include a top portion such that the gusset 46 may be limited or substantially precluded from sliding fully out of the channel 146. As long as display mount 32, 132 and wheel assembly 30 are horizontally and vertically movable relative to each other, the functions of raising and lowering a display rack will be achieved. Although head 50 of threaded rod 48 is disclosed as being hexagonally-shaped, it should be appreciated that head 50 may be alternatively configured, such as being adapted to receive an allen wrench or bit or the like.

As noted, the display mounts 32, 132 of the illustrated embodiments are adapted to interface with specific styles of display racks. However, it is understood that alterations may be made to the display mounts such that they are able to interface with variations of display racks. For example, the pallet rack mount 36 may be adapted to interface with pallet racks having wider or narrower pallet rack legs 37 and alternative spacing or location of through holes 96 by utilizing correspondingly wider or narrower openings 84 of C-shaped brace 54 and alternatively located through holes 86, 88, 90. Similarly, mounting brackets 52, 54 of display mounts 32, 132 could be constructed to mate with alternatively shaped display rack members, such as circular, triangular, or the like, without affecting the function of the transport device. Wheel assembly 30 may also be alternatively constructed and still function as intended. For example, lift sleeve 136 could be mounted directly to base 134, either above or below base 134, without the use of center hole 138. Furthermore, only one wheel 41 or more than two wheels 41 could be affixed to base 134. Other variations of the display mounts and wheel devices may be implemented depending on the particular application of the display rack transport device, without affecting the scope of the present invention.

Therefore, the display rack transport device of the present invention provides an efficient and safe method for relocating display racks, such as pallet racks, storage racks, and shelf racks, or the like. A common wheel assembly may be used with multiple different display mounts, such as a pallet rack mount, a storage rack mount, a shelf rack mount, or the like, thereby enabling many different display racks to be moved using common and/or fewer components. In addition, the ability of the pallet rack mount and the storage rack mount to affix to different models or styles of pallet racks and storage racks, respectively, further increases the flexibility and capability of the transport device. By securing multiple display mounts located within the respective wheel assemblies to a display rack, the display rack may be readily raised in an accurate and controlled manner by rotation of a threaded rod or other lifting means. Upon elevating the display rack, it may be easily and efficiently relocated due to the wheels of the wheel assemblies and subsequently lowered when at the target location, such as by rotating the threaded rod in the opposite direction.

The above is a description of the preferred embodiments of the present invention. One skilled in the art will recognize that changes and modifications may be made without departing from the spirit of the disclosed invention, the scope of which is to be determined by the claims that follow and the breadth of interpretation that the law allows.

The embodiments of the invention in which I claim an exclusive property right or privilege are as follows:

1. A display rack transport device for moving pallet racks, said transport device comprising:
   a wheel assembly; and
   a display mount, said display mount being movably attachable to said wheel assembly and comprising:
   a pallet rack mount having a substantially C-shaped brace with spaced first and second legs, said first and second legs each including at least one hole, said at least one hole on said first leg being in substantial alignment with said at least one hole on said second leg, said C-shaped brace being adapted to receive a generally vertical member of a pallet rack such that each said at least one hole substantially aligns with through holes on the generally vertical member of the pallet rack, wherein said pallet rack mount further includes a sleeve having a mounting face and a display mount gusset extending from said mounting face, said C-shaped brace being secured to said display mount gusset distal from said sleeve, and wherein said sleeve is movably attachable to said wheel assembly.

2. The transport device of claim 1, wherein said pallet rack mount includes at least one lift pin, said lift pin being adapted to pass through said holes on said first and second legs and through the through holes on the vertical member of a pallet rack when said C-shaped brace receives the vertical member of the pallet rack.

3. The transport device of claim 1, wherein said first and second legs each include at least two holes, said at least two holes on said first and second legs being in substantial alignment with at least two through holes on the vertical member of a pallet rack when said C-shaped brace receives the vertical member of the pallet rack.

4. The transport device of claim 1, wherein said first and second legs each include at least three holes, said at least three holes on said first leg being in substantial alignment with said at least three holes on said second leg, and wherein said at least three holes on said first and second legs are located on said legs such that at least one hole on said first and second legs aligns with through holes on the vertical member of a pallet rack when said C-shaped brace receives the vertical member.

5. The transport device of claim 1, wherein said C-shaped brace includes a wall member, said first and second legs being secured to and extending from said wall member such that said first and second legs are oriented generally perpendicular to said wall member.

6. The transport device of claim 1, further including a threaded rod, and wherein said sleeve includes an internally threaded hole, wherein rotation of said threaded rod within said sleeve imparts vertical movement to said pallet rack mount.

7. A display rack transport device for moving pallet racks, said transport device comprising:
   a wheel assembly; and
   a display mount, said display mount being movably attachable to said wheel assembly and comprising:
   a pallet rack mount having a substantially C-shaped brace with spaced first and second legs, said first and second legs each including at least one hole, said at least one hole on said first leg being in substantial alignment with said at least one hole on said second leg, said C-shaped brace being adapted to receive a generally vertical member of a pallet rack such that each said at least one hole substantially aligns with through holes on the generally vertical member of the pallet rack, wherein said wheel assembly comprises:
   a base and at least two wheels pivotally mounted to said base; and
   a lift sleeve, said lift sleeve mounted to said base;
   wherein said pallet rack mount is movably attachable to said lift sleeve.

8. The transport device of claim 7 wherein said base further includes a center hole and a base slot, said base slot forming a channel through a mounting edge of said base to said center hole, and wherein said lift sleeve further includes a sleeve slot and a sleeve stop mounted to a bottom end of said lift sleeve, said lift sleeve being mounted to said base through said center hole such that said base slot and said sleeve slot are substantially aligned.

9. A display rack transport device for moving shelf racks, said transport device comprising:
   a wheel assembly; and
   a display mount, said display mount being movably attachable to said wheel assembly and comprising:
   a shelf rack mount having first and second mounting members, said first and second mounting members each having at least one hole, said at least one hole on said first mounting member being in substantial alignment with said at least one hole on said second mounting member, said first and second mounting members being adapted to receive a generally vertical support member of a shelf rack such that said at least one hole on said mounting members are not covered by said vertical support member and are positioned below a generally horizontal support member connected to the generally vertical support member of the shelf rack.

10. The transport device of claim 9 further including at least one lift pin, said lift pin adapted to pass through said holes on said mounting members, and wherein said lift pin is adapted to engage the generally horizontal support member when the vertical support member is received by said first and second mounting members and said shelf rack mount is raised relative to the vertical support member.

11. The transport device of claim 9 wherein said shelf rack mount further includes a sleeve having a mounting face and a display mount gusset extending from said mounting face, said first and second mounting members being secured to said display mount gusset distal from said sleeve, and wherein said sleeve is movably attachable to said wheel assembly.

12. The transport device of claim 11 further including a threaded rod, and wherein said sleeve includes an internally threaded hole, wherein rotation of said threaded rod within said sleeve imparts vertical movement to said shelf rack mount.

13. The transport device of claim 9 wherein said wheel assembly comprises:
   a base and at least two wheels pivotally mounted to said base; and
   a lift sleeve, said lift sleeve mounted to said base;
   wherein said shelf rack mount is movably attachable to said lift sleeve.

14. The transport device of claim 13 wherein said base further includes a center hole and a base slot, said base slot forming a channel through a mounting edge of said base to said center hole, and wherein said lift sleeve further includes a sleeve slot and a sleeve stop mounted to a bottom end of said lift sleeve, said lift sleeve being mounted to said base through said center hole such that said base slot and said sleeve slot are substantially aligned.

15. A display rack transport device comprising:
a wheel assembly; and
a display mount, said display mount being movably attachable to said wheel assembly and comprising:
a mounting bracket having spaced first and second mounting flanges, said first and second mounting flanges each including a plurality of holes, said holes on said first mounting flange being in substantial alignment with said holes on said second mounting flange, said mounting bracket adapted to be removably mounted to a display rack wherein said first and second mounting flanges are adapted to receive a generally vertical support member of the display rack such that at least one of said holes on said first and second mounting flanges are not covered by the vertical support member and are positioned below a generally horizontal support member connected to the generally vertical support member of the display rack.

16. The transport device of claim 15 wherein at least one hole on said first and second mounting flanges substantially aligns with a through hole on the display rack when the display rack is received by said first and second mounting flanges.

17. The transport device of claim 15 wherein said display mount further includes a sleeve having a mounting face and a display mount gusset extending from said mounting face, said mounting bracket being secured to said display mount gusset distal from said sleeve.

18. The transport device of claim 15 wherein said display mount is removably attachable to said wheel assembly.

* * * * *